US012793393B2

(12) United States Patent
Mopur et al.

(10) Patent No.: US 12,793,393 B2
(45) Date of Patent: Nov. 10, 2026

(54) NEAR LINEAR AUTOENCODERS FOR CLASS LOCALIZATION AND ANOMALY DETECTION

(71) Applicant: HEWLETT PACKARD ENTERPRISE DEVELOPMENT LP, Spring, TX (US)

(72) Inventors: Satish Kumar Mopur, Bangalore (IN); Gunalan Perumal Vijayan, Bangalore (IN); Shounak Bandopadhyay, Bangalore (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 188 days.

(21) Appl. No.: 18/656,924

(22) Filed: May 7, 2024

(65) Prior Publication Data

US 2025/0278924 A1 Sep. 4, 2025

(30) Foreign Application Priority Data

Feb. 29, 2024 (IN) ............................. 202441014985

(51) Int. Cl.
*G06V 10/774* (2022.01)
*G06N 3/0455* (2023.01)
(Continued)

(52) U.S. Cl.
CPC ......... *G06V 10/774* (2022.01); *G06N 3/0455* (2023.01); *G06T 7/0002* (2013.01);
(Continued)

(58) Field of Classification Search
CPC .. G06V 10/774; G06V 10/762; G06V 10/764; G06V 10/772; G06V 10/776;
(Continued)

(56) References Cited

U.S. PATENT DOCUMENTS

2021/0133565 A1* 5/2021 Shamir .................... G06N 3/08
2025/0238718 A1 7/2025 Mopur et al.

OTHER PUBLICATIONS

M. Basirat and P. M. Roth, "L*ReLU: Piece-wise Linear Activation Functions for Deep Fine-grained Visual Categorization," 2020 IEEE Winter Conference on Applications of Computer Vision (WACV), Snowmass, CO, USA, 2020, pp. 1207-1216. (Year: 2020).*

(Continued)

*Primary Examiner* — Emily C Terrell
*Assistant Examiner* — Daniella M. DiGuglielmo
(74) *Attorney, Agent, or Firm* — Sheppard Mullin Richter Hampton LLP

(57) ABSTRACT

Examples of the presently disclosed technology provide a "near linear" activation function for an autoencoder (AE). The "near linear" activation function may comprise a piece-wise function comprising: (1) a linearly-sloped middle segment spanning a majority of a domain of the piece-wise near linear activation function; (2) a first end segment with a different slope than the linearly-sloped middle segment, wherein the first end segment commences at a lower boundary of the domain of the piece-wise near linear activation function and terminates at a first end of the linearly-sloped middle segment; and (3) a second end segment with a different slope than the linearly-sloped middle segment, wherein the second end segment commences at a second end of the linearly-sloped middle segment and terminates at an upper boundary of the domain of the piece-wise near linear activation function.

20 Claims, 8 Drawing Sheets

(51) Int. Cl.
*G06T 7/00* (2017.01)
*G06V 10/762* (2022.01)
*G06V 10/764* (2022.01)
*G06V 10/772* (2022.01)
*G06V 10/776* (2022.01)
*G06V 10/82* (2022.01)

(52) U.S. Cl.
CPC .......... *G06V 10/762* (2022.01); *G06V 10/764* (2022.01); *G06V 10/772* (2022.01); *G06V 10/776* (2022.01); *G06V 10/82* (2022.01); *G06T 2207/20081* (2013.01); *G06T 2207/20084* (2013.01)

(58) Field of Classification Search
CPC ...... G06V 10/82; G06N 3/0455; G06N 3/045; G06N 3/048; G06N 3/084; G06N 3/088; G06T 7/0002; G06T 2207/20081; G06T 2207/20084
See application file for complete search history.

(56) References Cited

OTHER PUBLICATIONS

V. M. Vargas et al., “Activation Functions for Convolutional Neural Networks: Proposals and Experimental Study,” IEEE Transactions on Neural Networks and Learning Systems, 2023, vol. 34, No. 3, pp. 1478-1488. (Year: 2023).*
A. A. Alkhouly et al., “Improving the Performance of Deep Neural Networks Using Two Proposed Activation Functions,” IEEE Access, 2021, vol. 9, pp. 82249-82271. (Year: 2021).*
V. L. Cao et al., “Learning Neural Representations for Network Anomaly Detection,” IEEE Transactions on Cybernetics, 2019, vol. 49, No. 8, pp. 3074-3087. (Year: 2019).*
W. Jiang, “A Machine Vision Anomaly Detection System to Industry 4.0 Based on Variational Fuzzy Autoencoder,” Comput Intell Neurosci, 2022, pp. 1-10. (Year: 2022).*
“The CIFAR-10 dataset”, available online at <https://www.cs.toronto.edu/~kriz/cifar.html>, 2024, 4 pages.
Akcay et al., “GANomaly: Semi-Supervised Anomaly Detection via Adversarial Training”, Nov. 2018, 16 Pages.
Benítez et al., “Dataset from fundus images for the study of diabetic retinopathy”, 2021, 5 pages.
Defard et al., “PaDiM: a Patch Distribution Modeling Framework for Anomaly Detection and Localization”, Nov. 2020, 7 pages.
Kathleen Siddell, “Automated Anomaly Detection in Manufacturing”, available online at <https://alwaysai.co/blog/anomaly-detection-manufacturing>, Mar. 3, 2023, 8 pages.
Scikit-learn developers, “1.6. Nearest Neighbors”, available online at <https://scikit-learn.org/stable/modules/neighbors.html>, 2024, 10 pages.
Seldon Technologies Ltd. “Alibi Detect”, available online at <https://docs.seldon.io/projects/alibi-detect/en/stable/>, 2019, 3 pages.
Tensor Flow, “mnist”, available online at <https://www.tensorflow.org/datasets/catalog/mnist>, Jun. 2023, 4 pages.
Wei Jiang, “A Machine Vision Anomaly Detection System to Industry 4.0 Based on Variational Fuzzy Autoencoder”, Computational Intelligence and Neuroscience, vol. 2022, Article ID 1945507, 10 pages.
Wikipedia, “Gram matrix”, available online at <https://en.wikipedia.org/w/index.php?title=Gram_matrix&oldid=1093332712>, Jun. 2022, 6 pages.
Wikipedia, “Jenks natural breaks optimization”, available online at <https://en.wikipedia.org/w/index.php?title=Jenks_natural_breaks_optimization&oldid=935510971>, Jan. 2020, 3 pages.
Zhao et al., “Anomaly Detection for Medical Images Using Self-Supervised and Translation-Consistent Features”, IEEE Transactions on Medical Imaging, vol. 40, No. 12, Dec 2021, 11 pages.
Andrei Nicolae, “PLU: The Piecewise Linear Unit Activation Function”, Sep. 3, 2018, 6 pages.
Inturrisi et al., “Piecewise Linear Units Improve Deep Neural Networks”, Aug. 4, 2021, 13 pages.

* cited by examiner $$f(x) = \begin{cases} \text{alpha}, & 0 \le x < th_1 \\ ax, & th_1 \le x \le (1 - th_2)\,;\text{where } x \in \{0,1\} \\ \text{beta}, & (1 - th_2) < x \le 1 \end{cases}$$

NEAR LINEAR AUTOENCODERS FOR CLASS LOCALIZATION AND ANOMALY DETECTION

BACKGROUND

Machine learning models may comprise algorithm-based computer programs trained to recognize patterns in data and make predictions and/or classifications based on such learned pattern recognition.

A neural network model (sometimes referred to as an artificial neural network) is a type of machine-learning model inspired by structure of the human brain. For example, a neural network model may comprise a series of algorithms trained to recognize patterns in data in a manner that mimics how a human brain works. For conceptualization, neural network models are sometimes described as being composed of interconnected "neurons" arranged into layers (much like in a human brain). A respective neuron implements an activation function (e.g., an algorithm) that computes an output based on weighted inputs the respective neuron receives from one or more neurons in a previous layer.

For example, a common neuron-based conceptualization describes a neural network model in terms of: (a) an input layer of neurons that receives input data and produces outputs; (b) one or more hidden layers of neurons that receive weighted outputs from the input layer (or in the case of multiple hidden layers, weighted outputs from a previous hidden layer) and produce their own outputs; and (c) an output layer of neurons that receives weighted outputs from the last hidden layer and produces an output prediction/classification. As alluded to above, a respective neuron implements an activation function (e.g., an algorithm) that computes an output based on weighted inputs the respective neuron receives from the neurons of a previous layer.

BRIEF DESCRIPTION OF THE DRAWINGS

The present disclosure, in accordance with one or more various examples, is described in detail with reference to the following figures. The figures are provided for purposes of illustration only and merely depict examples.

Figure 1:
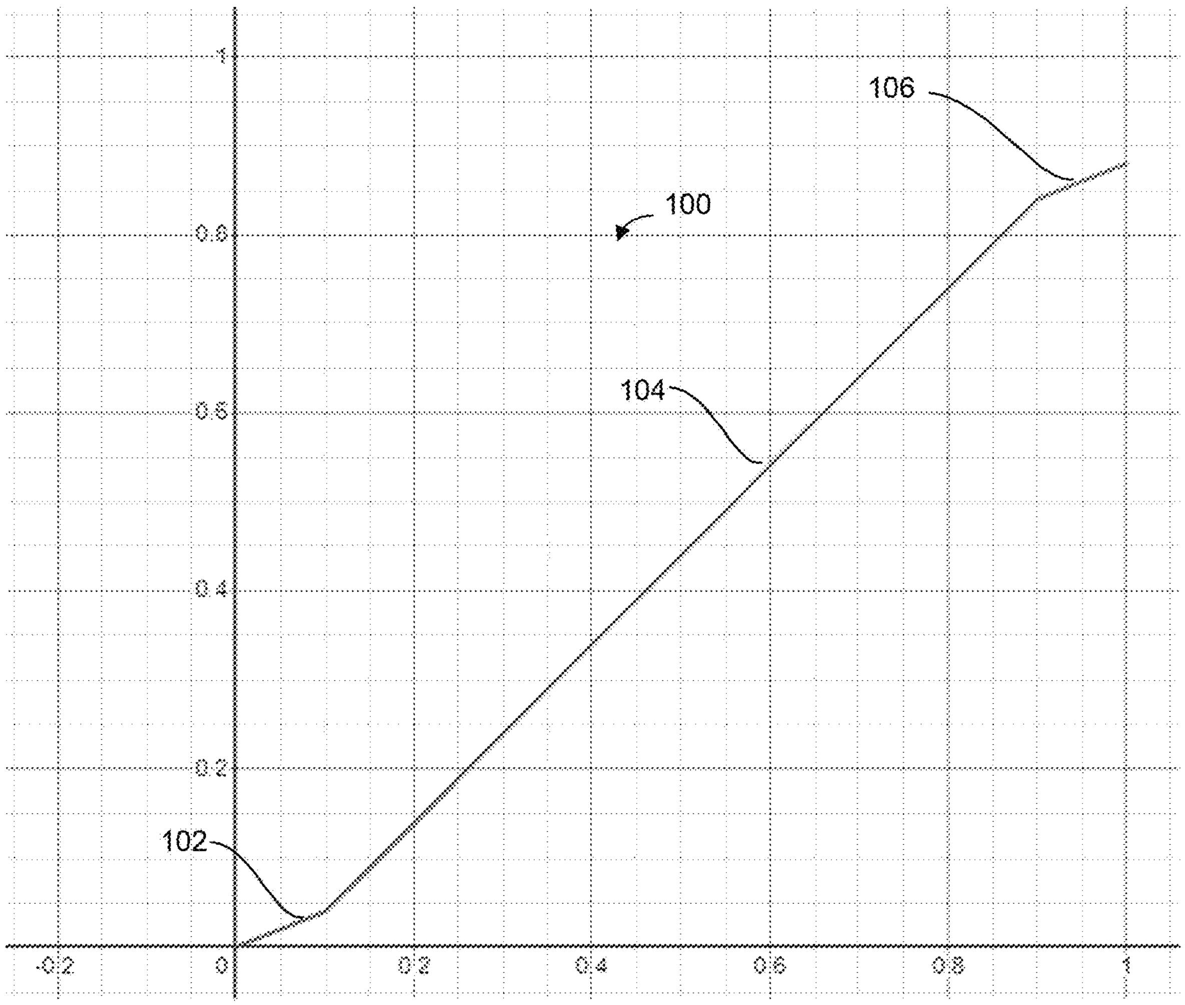
FIG. 1 depicts a graph of a near linear activation function, in accordance with various examples of the presently disclosed technology.

The figures are not exhaustive and do not limit the present disclosure to the precise form disclosed.

DETAILED DESCRIPTION

Autoencoders (AEs) are neural network models used to encode (i.e., compress), and then decode (i.e., decompress) data. Accordingly, AEs are often described as comprising: (1) an encoder (e.g., a first set of neural network layers) that encodes input data (e.g., an input image) into a latent representation (as used herein a latent representation may refer to a lower dimensional representation of input data); and (2) a decoder (e.g., a second set of neural network layers) that decodes the latent representation into output data (e.g., a reconstruction of the input image). Measured differences between the input data and the output data are referred to as reconstruction loss. AEs are typically used to encode/decode unlabeled input data—and thus are associated with so-called unsupervised machine learning.

AEs have various practical applications. For example, AEs are often used to: (1) remove noise from input data (e.g., to remove noise from images or audio); (2) reconstruct input data with missing features (e.g., to reconstruct an image that has missing features); and/or (3) to extract critical features from input data to making more accurate predictions or classifications.

For the practical applications referenced above, a first AE that excels at identifying critical features which characterize input data is often more desirable than a second AE that reconstructs input data with de minimis reconstruction loss. For example, in the practical application of removing noise from an input image (i.e., de-noising the input image), the first AE may excel at identifying the critical features which characterize the input image. The first AE may then encode such critical features into a latent representation, while filtering out (or otherwise leaving out) noise-related features which the first AE determines are relatively less critical for characterizing the input image. The first AE can then reconstruct an improved version of the input image (i.e., a version of the input image with the noise removed) from the latent representation. By contrast, the second AE may be less discriminating (by construction/design) when encoding the latent representation. For example, the second AE may filter out less of the noise-related features of the input image when encoding a latent representation due to having hyperparameters that facilitate lower reconstruction loss. Accordingly, while the second AE may reconstruct the input image with less reconstruction loss than the first AE, the image reconstructed by the second AE will contain more of the noise-related features that the first AE was so effective at removing.

There are various hyperparameters for AEs that can be tuned in order to promote the characteristics described above for the first and second AE. Such hyperparameters may include: (a) number of neural network layers; (b) number of neurons per neural network layer; and (c) filter size of the encoder, latent representation, and decoder respectively. Another hyperparameter that can be tuned is the activation function utilized by an AE.

For example, an AE (e.g., the second AE) that utilizes a linear activation function (i.e., an AE with constituent neurons that implement a linear activation function) will tend to reconstruct input data with de minimis reconstruction loss. In other words, the "linear" AE will reconstruct input data almost exactly. However, this accurate reconstruction comes at a cost—namely a reduced ability of the linear AE to effectively identify/learn the critical features which characterize input data. As alluded to above, reduced ability to identify/learn the critical features which characterize input data is not desirable in common practical applications for AEs such as de-noising input data, reconstructing input data within missing elements, and extracting critical features of input data for improved classifications and predictions. This reduced ability to abstract learnings from training is sometimes referred to as overfit. As used herein, overfit may refer to a phenomenon in machine learning where a model is overtrained on a dataset, causing large errors when the model is deployed at inference and processes new/unlearned data. In other words, overfit may refer to a model's inability (or reduced ability) to abstract/apply learnings from training to new real-world data.

In comparison to AEs which utilize linear activations functions, AEs which utilize non-linear activation functions tend to identify/learn the critical features which characterize input data much more effectively. While such learning improvement can come at a cost of higher reconstruction loss, higher reconstruction loss is generally acceptable (or arguably even desired) in common practical applications for AEs such as de-noising input data, reconstructing input data within missing elements, and extracting critical features of input data for improved classifications and predictions. In other words, in these common practical applications, the benefits of improved learning capacity generally outweigh the costs of increased reconstruction loss. For the reasons alluded to above, non-linear activation functions (e.g., logistic, Soboleva modified hyperbolic tangent (smht), Rectified Linear Unit (ReLU), Gaussian Error Linear Unit (GELU), Leaky ReLU, Scaled Exponential Linear Unit (SELU), etc.) are commonly utilized in AEs. In general, use of non-linear activation functions can reduce overfit that is often characteristic of neural network models (e.g., AEs) which utilize linear activation functions.

While AEs that utilize conventional non-linear activations functions (referred to herein as "non-linear AEs") are often preferred in the practical applications referenced above, they perform less effectively in another practical application for AEs—namely preparing reference data (sometimes referred to as "gold standard" data) for anomaly detection. This is because non-linear AEs tend to filter out certain features of input data—which the non-linear AEs deem to be less critical features—that can be indicative of anomalies. Accordingly, in anomaly detection applications the benefits of improved learning capacity promoted by using non-linear activation functions may not always outweigh the costs of increased reconstruction loss. More colloquially, non-linear AEs can be "too smart for their own good" when it comes to preparing reference/"gold standard" data for anomaly detection purposes. While utilizing a linear activation function could reduce such a tendency AEs which utilize linear activation functions tend to overfit, which is still a problem in anomaly detection applications.

Against this backdrop, examples of the presently disclosed technology provide a new activation function—i.e., a "near linear" activation function—for an AE. The "near linear" activation function is designed to reconstruct input data (e.g., images) with minimal reconstruction loss (e.g., with minimal differences between an original image and a reconstructed version of the original image) while also reducing/eliminating overfit. Namely, a predominant linearly-sloped middle segment of the near linear activation function facilitates data reconstruction with minimal reconstruction loss. Small non-linearities at the boundaries of the predominant linearly-sloped middle segment reduce/eliminate overfit characteristic of AEs that utilize purely linear activation functions. In other words, introduction of the small non-linearities at the boundaries of the predominant linearly-sloped middle segment enables more effective back propagation during training, thereby increasing learning capacity for an AE that utilizes the near linear activation function. Moreover, examples can tune size of the non-linearities to minimize stabilized reconstruction loss during training.

Various examples leverage "near linear" AEs (i.e., AEs that utilize the above-described "near linear" activation function) to detect anomalous images and/or to localize images to classes. Namely, examples train and deploy near linear AEs to construct reference images from sample images. Examples can then use the reference images as a "gold standard" to compare production images against. Through such comparisons, examples can detect anomalies in the production images and/or localize the production images to closest classes. For this particularized application (i.e., anomaly detection and class localization), the reference images generated by the near linear AEs can provide a better gold standard than reference images generated by conventional AEs which reconstruct images with higher reconstruction loss (e.g., AEs that utilize conventional non-linear activations functions).

In certain implementations, examples can further gild the reference images by leveraging multiple near linear AEs which specialize in reconstructing images within a particular few-class group.

For concept illustration, a training dataset (e.g., the CIFAR-10 dataset) may comprise images categorized into 10 classes (e.g., airplane, automobile, bird, cat, deer, dog, frog, horse, ship, truck). Examples can segment the 10 classes of the training dataset into few class groups, where each few class group comprises images within a subset of the 10 classes. Examples can utilize various heuristics for grouping similar classes into the few class groups (such grouping may be performed by a user, or autonomously). For instance, a first few class group may comprise a "four-legged animal" few class group, and may comprise images belonging to classes which are four-legged animals (e.g., cat, deer, dog, horse, frog). A second few class group may comprise a "winged-animal" few class group, and may comprise images belonging to classes which are winged-animals (e.g., bird). A third few class group may comprise a "wheeled-vehicle" few class group, and may comprise images belonging to classes which are wheeled-vehicles (e.g., automobiles, trucks, airplanes). Instead of training one near linear AE to reconstruct images across the 10 classes of the training dataset, examples can ensure that images are reconstructed more closely/precisely (i.e., with lower reconstruction loss) by training specialized near linear AEs to reconstruct images within each few class group. For instance, examples can train: (1) a first near linear AE to reconstruct images within the first/"four-legged animal" few class group; (2) a second near linear AE to reconstruct images within the second/"winged-animal" few class group; (3) a third near linear AE to reconstruct images within the third/"wheeled-vehicle" few class group; etc.

The disclosed "near linear" activation function can provide a technical improvement over conventional activation functions that include linear segments (e.g., ReLU, GELU, SELU, and others). Namely, the unique features of the disclosed "near linear" activation function (i.e., small non-linearities at the boundaries of a predominant linearly-sloped middle segment) have been optimized and empirically tested to minimize image reconstruction loss while reducing/eliminating overfit. For example, the predominant linearly-sloped middle segment (e.g., a middle segment with a linear slope that spans a majority of a domain of the near linear activation function) facilitates image reconstruction with minimal reconstruction loss. The small non-linearities at the boundaries of the predominant linearly-sloped middle segment reduce/eliminate overfit characteristic of purely linear activation functions. Moreover, the present disclosure provides methodologies for tuning/optimizing size of the boundary non-linearities in a manner that minimizes a stabilized reconstruction loss during training.

As described above, for the particularized application of anomaly detection, reference images generated by near linear AEs of the disclosed technology can provide a better gold standard than reference images generated by conventional AEs which reconstruct images with higher reconstruction loss (e.g., AEs that utilize conventional non-linear activations functions). While generally acceptable or even desirable in many practical applications for AEs (e.g., denoising input data, reconstructing input data within missing features, etc.), higher abstraction/higher reconstruction loss is less acceptable/desirable when reconstructing images to serve as a gold standard set for anomaly detection. This is because small/seemingly insignificant features of an image—which many conventional AEs would filter out due to perceived non-importance—may be critical for detecting/identifying anomalies. It is for this reason that examples of the presently disclosed technology leverage near linear AEs that reconstruct images as closely as possible, while still learning effectively during training.

For the particularized application of anomaly detection, segmenting a training dataset into few class groups can also provide technical improvements over conventional technologies which do not perform such a segmentation. For context, in many technical applications it is more desirable to train a neural network to learn many different classes so that when the neural network is deployed at inference, it can more easily generalize/abstract its training to new data. However, the capacity to generalize/abstract training to new data is less critical where AEs are being used to generate "gold standard" reference images for anomaly detection purposes. Instead, in this particular application it can be more important to reconstruct training images very closely—which can be achieved more effectively by leveraging multiple near linear AEs which specialize in reconstructing images within a particular few-class group.

Examples of the presently disclosed technology will now be described in more detail conjunction with the following figures.

FIG. 1 depicts a graph of a near linear activation function 100, in accordance with various examples of the presently disclosed technology.

Near linear activation function 100 comprises: (1) a predominant linearly-sloped middle segment 104 (i.e., a linearly-sloped middle segment that spans a majority of the domain of near linear activation function 100); (2) a first end segment 102 with a different slope than predominant linearly-sloped middle segment 104; and (3) a second end segment 106 with a different slope than predominant linearly-sloped middle segment 104. As depicted, predominant linearly-sloped middle segment 104 spans a majority (i.e., more than 50%) of the domain of near linear activation function 100. In certain implementations, predominant linearly-sloped middle segment 104 may span, e.g. 80% or more of the domain of near linear activation function 100.

First end segment 102 commences at a lower boundary of the domain of near linear activation function 100 and terminates at a first end of predominant linearly-sloped middle segment 104. Second end segment 106 commences at a second end of predominant linearly-sloped middle segment 104 and terminates at an upper boundary of the domain of near linear activation function 100. In the specific example of FIG. 1, the domain of near linear activation function 100 has been normalized to {0,1}. However, in other implementations near linear activation function 100 may have a different domain.

As alluded to above, near linear activation function 100 provides a technical improvement over conventional activation functions that include linear segments (e.g., ReLU, GELU, SELU, and others). Namely, the unique features of near linear activation function 100 (i.e., small non-linearities at the boundaries of predominant linearly-sloped middle segment 104) have been optimized and empirically tested to minimize image reconstruction loss while reducing/eliminating overfit. For example, predominant linearly-sloped middle segment 104 facilitates image reconstruction with minimal reconstruction loss. The small non-linearities at the boundaries of predominant linearly-sloped middle segment 104 (i.e., first end segment 102 and second end segment 106) reduce/eliminate overfit characteristic of purely linear activation functions. Moreover, as described in greater detail below, examples provide methodologies for tuning/optimizing relative domain lengths of the boundary non-linearities (i.e., tuning lengths of first end segment 102 and second end segment 106 in relations to the domain of near linear activation function 100) in a manner that minimizes a stabilized reconstruction loss during training.

Referring again to FIG. 1, FIG. 1 also depicts a mathematical representation of near linear activation function 100. As depicted, near linear activation function 100 may comprise a piece-wise function—f(x)—with a domain spanning 0 to 1. f(x) comprises three piece-wise segments—namely:

$$f(x) = \begin{cases} \text{alpha}, & 0 \le x < th_1 \\ ax, & th_1 \le x \le (1 - th_2)\text{; where } x \in \{0, 1\} \\ \text{beta}, & (1 - th_2) < x \le 1 \end{cases}$$

The function alpha may correspond with first end segment 102. The function ax may correspond with predominant linear middle segment 104 (here "a" represents a tunable constant). The function beta may correspond with second end segment 106. While in the specific example of FIG. 1 alpha and beta are linear functions with different slope than ax, in other implementations one or both of alpha and beta may comprise non-linear functions.

As illustrated by the mathematical representation of near linear activation function 100—relative domain lengths of alpha and beta can be tuned by adjusting the values of thresholds $th_1$ and $th_2$ (in certain implementations $th_1$ and $th_2$ may be equivalent, but this need not be the case). Namely, as the thresholds $th_1$ and $th_2$ increase, so do the domain lengths of alpha and beta relative to the predominant linear middle segment (i.e., the function ax corresponding with predominant linear middle segment 104). As the relative domain lengths of alpha and beta increase, near linear activation function 100 may tend to behave increasing like a conventional non-linear activation function. By contrast, as the relative lengths of alpha and beta decrease, near linear activation function 100 may tend to behave increasing like a linear activation function.

As alluded to above, in certain implementations examples can tune the relative domain lengths of alpha and beta (e.g., by tuning the values of thresholds $th_1$ and $th_2$) during training of a near linear AE that utilizes near linear activation function 100. For instance, examples can select/determine values for the relative domain lengths of alpha and beta that produce a minimum stabilized reconstruction loss when the near linear AE reconstructs training images. In various implementations, examples can apply a successive halving algorithm to make such a selection/determination. An illustrative example of pseudocode for such a successive halving algorithm is provided below. In this specific illustrative example, $th_1=th_2=th$.

1. Let $th_{high1}=0.1$ and $th_{low1}=0.01$, where $th_{high1}$ and $th_{low1}$ comprise upper and lower threshold values respectively for an end segment domain length search space;
2. Define a number of training iterations;
3. Execute near linear AE training for $th_{high1}$ and $th_{low1}$ and store the stabilized reconstruction losses (RL) during evaluation;
4. Apply successive halves to $th_{high1}$ and $th_{low1}$;
5. Define new thresholds $th_{high2}$ and $th_{low2}$, for the successive half with lower RL and repeat steps 3 and 4;
6. Repeat steps 3-5 to evaluate additional threshold values over the of the training iterations; course
7. At the end of the training iteration count, choose the value of th which produced the minimum stabilized RL.

In various implementations, the above-referenced training iterations can be tuned by a user.

Figure 2:
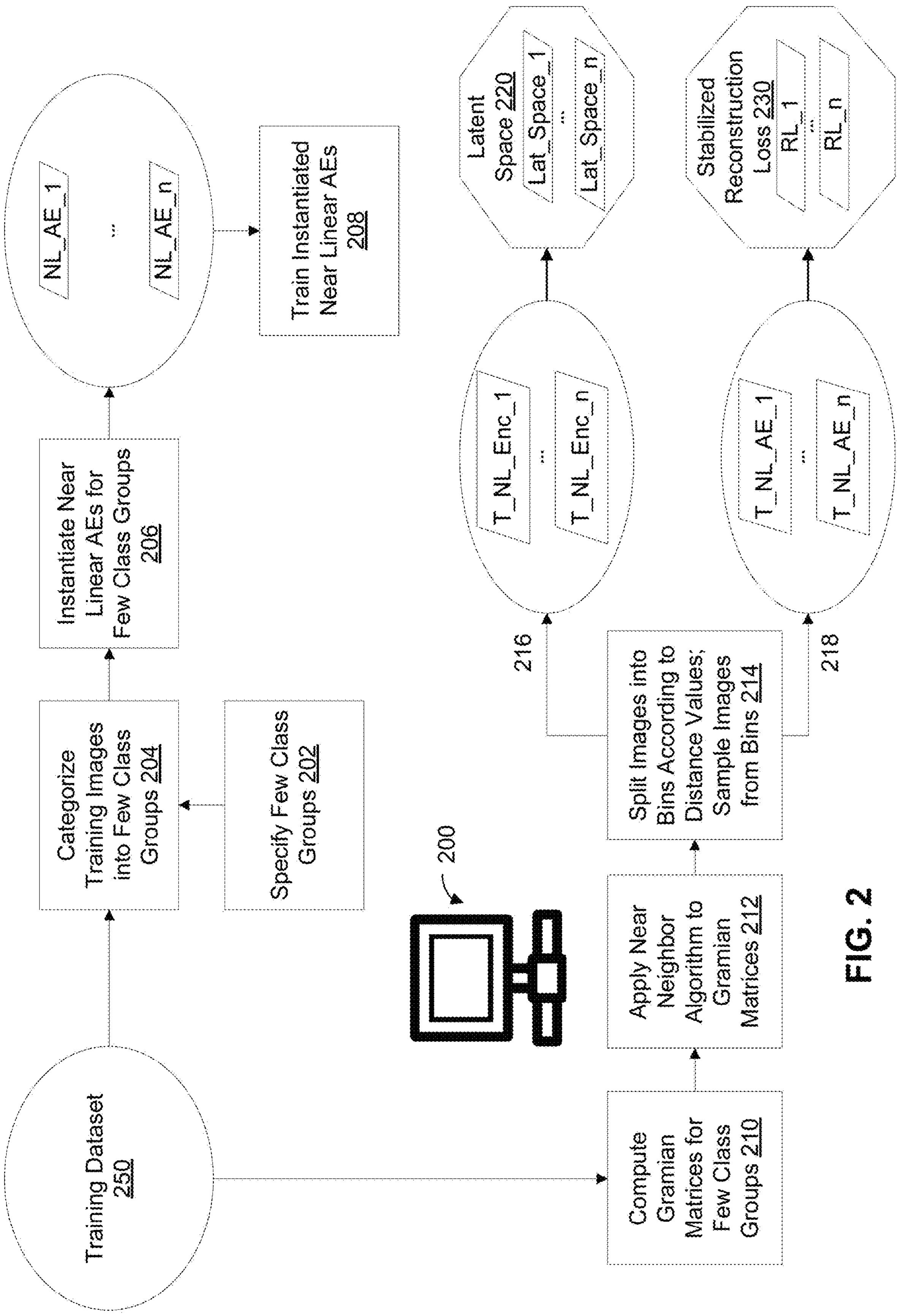
FIG. 2 illustrates an example flowchart that can be used to train near linear autoencoders (AEs) to construct a reference images, in accordance with various examples of the presently disclosed technology.

FIG. 2 illustrates an example flowchart that can be used to train near linear AEs to construct reference images, in accordance with various examples of the presently disclosed technology. An example computing component 200 can execute operations of the flowchart.

As alluded to above, computing component 200 can reconstruct improved reference images for use in anomaly detection by leveraging multiple near linear AEs which specialize in reconstructing images within a particular few-class group. Namely, for the purposes of anomaly detection it can be critical to reconstruct reference images from training images very closely—which can be achieved more effectively by leveraging multiple near linear AEs which specialize in reconstructing images within a particular few-class group.

Accordingly, computing component 200 can execute operation 202 to specify/define few class groups for a training dataset 250.

For concept illustration, training dataset 250 (e.g., the CIFAR-10 dataset) may comprise images categorized into 10 classes (e.g., airplane, automobile, bird, cat, deer, dog, frog, horse, ship, truck). Computing component 200 can specify/define few class groups for these 10 classes, where each few class group comprises images within a subset of the 10 classes.

In certain implementations, computing component 200 can make these few class group specifications/definitions automatically based on one or more heuristics for grouping similar classes into few class groups (such heuristics may be user defined or generated by computing component 200 automatically). In other implementations, computing component 200 can make the few class group specifications/definitions in response to user input.

As an illustrative example, computing component 200 can specify/define: (1) a first few class group for training dataset 250 as a "four-legged animal" few class group; (2) a second few class group as a "winged-animal" few class group; and (3) a third few class group as a "wheeled-vehicle" few class group. These three few class group examples will be used when describing FIGS. 2-3 for concept illustration.

Computing component 200 can then execute operation 204 to categorize images from training dataset 250 into the specified/defined few class groups. For example, computing component 200 can categorize images belonging to classes which are four-legged animals (e.g., cat, deer, dog, horse, frog) into the first/"four-legged animal" few class group. Computing component 200 can categorize images belonging to classes which are winged-animals (e.g., birds) into the second/"winged-animal" few class group. Computing component 200 can categorize images belonging to classes which are wheeled-vehicles (e.g., automobiles, trucks, airplanes) into the third/"wheeled-vehicle" few class group.

Related to above, computing component 200 can execute operation 206 to instantiate a near linear AE (i.e., an AE that utilizes a near linear activation function of the disclosed technology) for each specified/defined few class group. These near linear AEs are represented in FIG. 2 as NL_AE_1-NL_AE_n.

Computing component 200 can then execute operation 208 to train the near linear AE instances to reconstruct training images for their respective few class groups. For example, computing component 200 can train: (1) a first near linear AE instance (e.g., NL_AE_1) to reconstruct images within the first/"four-legged animal" few class group; (2) a second near linear AE instance (e.g., NL_AE_2) to reconstruct images within the second/"winged-animal" few class group; and (3) a third near linear AE instance (e.g., NL_AE_3) to reconstruct images within the third/"wheeled-vehicle" few class group.

After training the near linear AE instances to reconstruct training images for their respective few class groups, computing component 200 can utilize the trained near linear AEs instances (represented as T_NL_AE_1-T_NL_AE_n in FIG. 2) to construct reference images based on images sampled from training dataset 250.

As depicted, computing component 200 may perform a few operations (i.e., operations 210-214) to intelligently select the sample images from training dataset 250.

For example, computing component 200 can execute operation 210 to compute a Gramian matrix for each specified/defined few class group. As used herein, a Gramian matrix, also known as a Gram matrix or an inner product matrix, may refer to a matrix whose entries are computed as the inner product of a set of vectors. Here, the set of vectors for a respective few class group may comprise vector representations of the images categorized to the respective few class group. In certain implementations, computing component 200 can compute the vector representations of the images categorized to the respective few class group as follows:

- For gray scale images, vector representations can map to pixel values ranging from 0 (black) to 255 (white);
- For color images, vector representations can map to pixel values where pixels are represented by three color channels (R, G, and B), with each channel containing an intensity value ranging from 0 to 255.

Each entry G [i, j] of a computed Gramian matrix for a respective few class group may correspond with a computed inner product between features of an image i and an image j within the respective few class group. Here, a computed inner product for two images can measure the similarity/alignment between the two images. Accordingly, by analyzing values in a Gramian matrix for a respective few class group, computing component 200 can make insights into the relationships and patterns among constituent images within the respective few class group.

Computing component 200 can execute operation 212 to apply a nearest neighbor algorithm (e.g., the K-nearest neighbor algorithm) to the computed Gramian matrices to compute distance values between images within each few class group.

Computing component 200 can then execute operation 214 to split images within each few class group into bins according to their computed distance values. Within each bin, computing component 200 can then sample images from: (1) near the lowest distance values within the bin; (2) near a middle of distance values across the range of distance values in the bin; and (3) near the highest distance values within the bin. In this way, computing component 200 can sample images across a full range of distance values in order to obtain an improved/optimum representation of the training dataset.

With an intelligent sample of images from each few class group selected/determined, computing component 200 can execute operation 216 to provide the sampled images to encoder instances of appropriate trained near linear AEs. The encoder instances of the trained near linear AEs can then encode the sampled images into latent representations.

For example, computing component 200 can provide a first sample of images categorized to the first/"four-legged animal" few class group to an encoder instance of the trained first near linear AE (e.g., T_NL_Enc_1). The encoder instance of the trained first near linear AE can then encode the first sample images into first latent representations (e.g., a Lat_Space_1 in FIG. 2).

Relatedly, computing component 200 can provide a second sample of images categorized to the second/"winged-animal" few class group to an encoder instance of the trained second near linear AE (e.g., T_NL_Enc_2). The encoder instance of the trained second near linear AE can then encode the second sample images into second latent representations (e.g., a Lat_Space_2).

Similarly, computing component 200 can provide a third sample of images categorized to the third/"wheeled-vehicle" few class group to an encoder instance of the trained third near linear AE (e.g., T_NL_Enc_3). The encoder instance of the trained third near linear AE can then encode the third sample images into third latent representations (e.g., a Lat_Space_3).

The above-referenced latent representations can be stored in latent space repository 220. As described in conjunction with FIG. 3, the latent representations stored in latent space repository 220 can be used to construct "gold standard" reference images against which production images can be compared for anomaly detection.

As depicted, computing component 200 can execute operation 218 provide the sampled images from training dataset 250 to instances of appropriate trained near linear AEs. The trained near linear AE instances can then reconstruct the sampled images, and computing component 220 can compute stabilized reconstruction losses for the reconstructed images.

For example, computing component 200 can provide a first sample of images categorized to the first/"four-legged animal" few class group to an instance of the trained first near linear AE (e.g., T_NL_AE_1). The instance of the trained first near linear AE can then reconstruct the first sample images. Computing component 200 can then compute first stabilized reconstruction losses (e.g., RL_1) for the reconstructed first sample images.

Relatedly, computing component 200 can provide a second sample of images categorized to the second/"winged-animal" few class group to an instance of the trained second near linear AE (e.g., T_NL_AE_2). The instance of the trained second near linear AE can then reconstruct the second sample images. Computing component 200 can the compute second stabilized reconstruction losses (e.g., RL_2) for the reconstructed second sample images.

Similarly, computing component 200 can provide a third sample of images categorized to the third/"wheeled-vehicle" few class group to an instance of the trained third near linear AE (e.g., T_NL_AE_3). The instance of the trained third near linear AE can then reconstruct the third sample images. Computing component 200 can then compute third stabilized reconstruction losses (e.g., RL_3) for the reconstructed third sample images.

The above-referenced stabilized reconstruction losses can be stored in stabilized reconstruction loss repository 230. As described in conjunction with FIG. 3, the stabilized reconstruction losses stored in stabilized reconstruction loss repository 230 can be used to detect anomalous production images.

Figure 3:
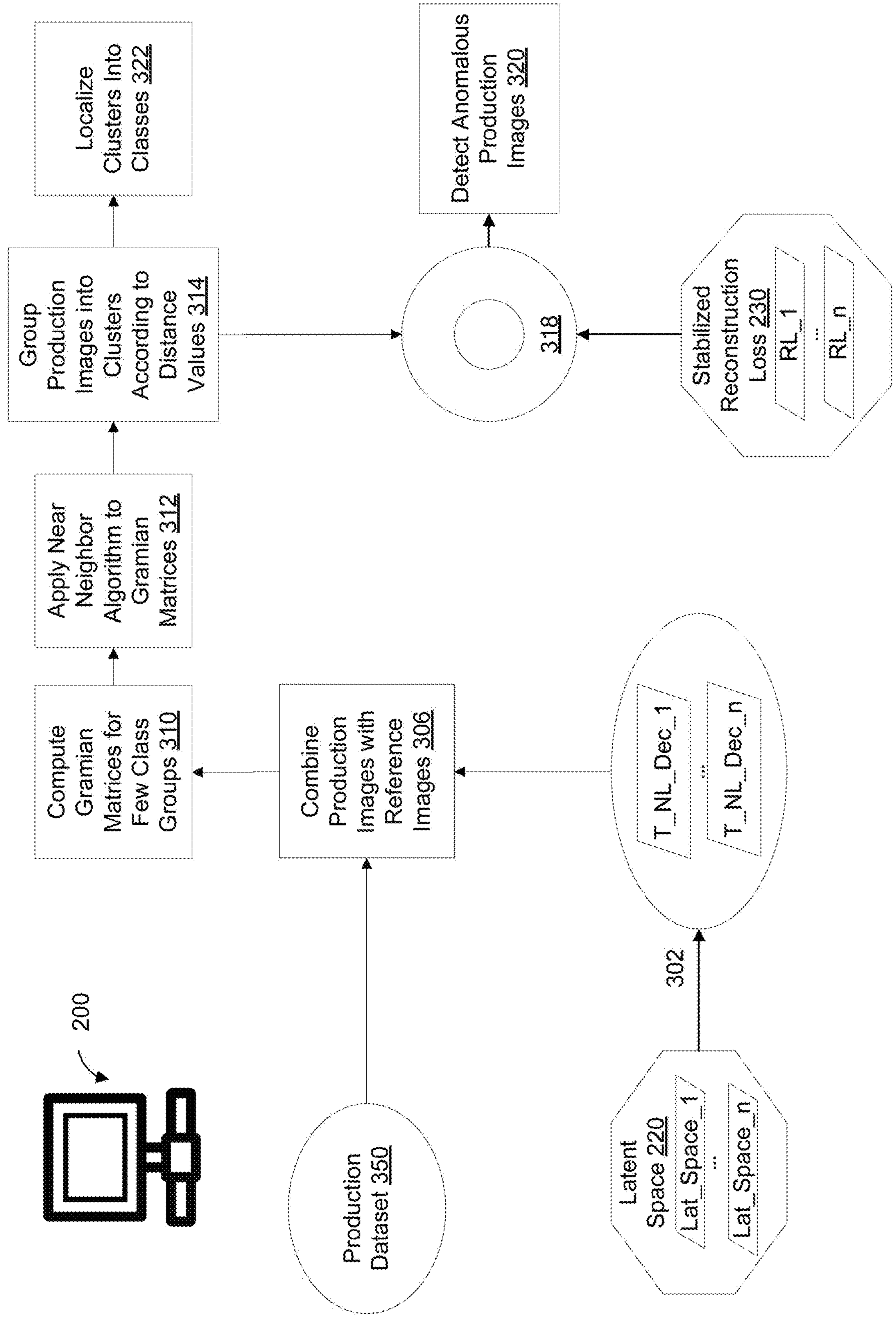
FIG. 3 illustrates an example flowchart that can be used to detect anomalous production images, in accordance with various examples of the presently disclosed technology.

FIG. 3 illustrates an example flowchart that can be used to detect anomalous production images, in accordance with various examples of the presently disclosed technology. The example computing component 200 from FIG. 2 can execute operations of the flowchart.

As alluded to above, for the particularized application of anomaly detection, reference images generated by near linear AEs of the disclosed technology can provide a better gold standard than reference images generated by conventional AEs which reconstruct images with higher reconstruction loss (e.g., AEs that utilize conventional non-linear activations functions). While generally acceptable or even desirable in many practical applications for AEs (e.g., denoising input data, reconstructing input data within missing features, etc.), higher abstraction/higher reconstruction loss is less acceptable/desirable when reconstructing images to serve as a gold standard set for anomaly detection. This is because small/seemingly insignificant features of an image—which many conventional AEs would filter out due to perceived non-importance—may be critical for detecting/identifying anomalies. It is for this reason that examples leverage near linear AEs that reconstruct images as closely as possible, while still learning effectively during training.

Accordingly, and as depicted in FIG. 3, computing component 200 can execute operation 302 to provide latent representations stored in latent space repository 220 to appropriate decoder instances of trained near linear AEs described in conjunction with FIG. 2 (represented in FIG. 3 as T_NL_Dec_1–T_NL_Dec_n). The decoder instances can then construct "gold standard" reference images from the latent representations.

For example, computing component 200 can provide latent representations of sampled images from the first/"four-legged animal" few class group (e.g., Lat_Space_1) to a decoder instance of the first near linear AE (e.g., T_NL_Dec_1). The decoder instance of the first near linear AE can then construct first reference images for the first/"four-legged" animal few class group.

Similarly, computing component 200 can provide latent representations of sampled images from the second/"winged-animal" few class group (e.g., Lat_Space_2) to a decoder instance of the second near linear AE (e.g., T_NL_Dec_2). The decoder instance of the second near linear AE can then construct second reference images for the second/"winged-animal" few class group.

Relatedly, computing component 200 can provide latent representations of sampled images from the third/"wheeled-vehicle" few class group (e.g., Lat_Space_3) to a decoder instance of the third near linear AE (e.g., T_NL_Dec_3). The decoder instance of the third near linear AE can then construct a third reference images for the third/"wheeled-vehicle" few class group.

As depicted, computing component 200 can execute operation 306 to combine the reference images constructed by the decoder instances of the near linear AEs with production images obtained from a production dataset 350.

Computing component 200 can then execute operation 310 to compute a Gramian matrix for each few class group based on the combined set(s) of images.

For example, computing component 200 can compute a first Gramian matrix for the first/"four-legged animal" few class group based on reference images categorized to the first/"four-legged animal" few class group and the production images.

Similarly, computing component 200 can compute a second Gramian matrix for the second/"winged-animal" few class group based on reference images categorized to the second/"winged-animal" few class group and the production images.

Relatedly, computing component 200 can compute a third Gramian matrix for the third/"wheeled-vehicle" few class group based on reference images categorized to the third/"wheeled-vehicle" few class group and the production images.

Computing component 200 can execute operation 312 to apply a near neighbor algorithm (e.g., a K-nearest neighbor algorithm) to the computed Gramian matrices to compute distance values for the production images in relation to each few class group.

For example, computing component 200 can apply the near neighbor algorithm to the first Gramian matrix to compute distance values for the production images in relation to the first/"four-legged animal" few class group.

Similarly, computing component 200 can apply the near neighbor algorithm to the second Gramian matrix to compute distance values for the production images in relation to the second/"winged-animal" few class group.

Relatedly, computing component 200 can apply the near neighbor algorithm to the third Gramian matrix to compute distance values for the production images in relation to the third/"wheeled-vehicle" few class group.

Here, relatively larger distance values for a production image in relation to the few class groups may indicate that the production image is an anomaly.

Computing component 200 can execute operation 314 to group production images into clusters according to their computed distance values. In certain implementations, computing component 200 can utilize a one-dimensional clustering algorithm (e.g., a Jenks natural breaks algorithm) that groups the production images into clusters according to their distance values. Here, clusters comprised of production images having relatively larger distance values may be isolated as anomalies.

As depicted, computing component 200 can execute operation 318 to compare the clusters of production images to stabilized reconstruction loss values stored in stabilized reconstruction loss repository 230.

For example, computing component 200 can compare clusters to the first stabilized reconstruction loss values for the first/"four-legged animal" few class group (e.g., RL_1) computed in conjunction with FIG. 2.

Relatedly, computing component 200 can compare clusters to the second stabilized reconstruction loss values for the second/"winged-animal" few class group (e.g., RL_2) computed in conjunction with FIG. 2.

Similarly, computing component 200 can compare clusters to the third stabilized reconstruction loss values for the third/"winged-animal" few class group (e.g., RL_3) computed in conjunction with FIG. 2.

Based on the above-described comparisons, computing component 200 can execute operation 320 to detect/determine anomalous images within the production images.

Computing component 200 can then execute operation 322 to localize production images which have not been determined to be anomalies to classes based on the clusters.

Figure 4:
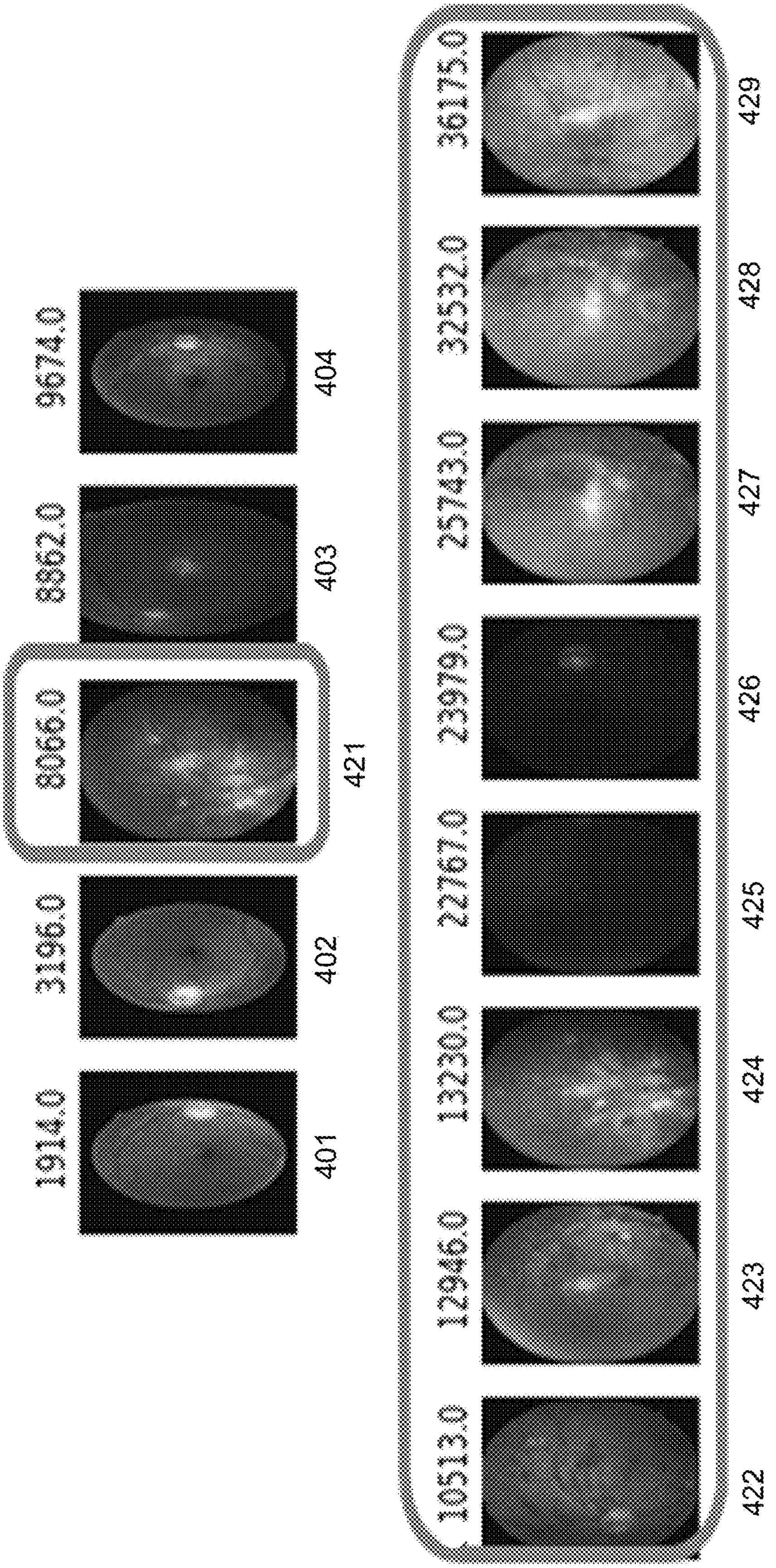
FIG. 4 illustrates results from example experiments conducted in accordance with examples of the presently disclosed technology.

FIG. 4 illustrates results from example experiments conducted in accordance with examples of the presently disclosed technology.

Namely, reference images 401, 402, 403, and 404 in FIG. 4 comprise reference images constructed by a near linear AE of the presently disclosed technology. Reference images 401-404 were constructed from sample images of "healthy" retinas from the Diabetic Retinopathy (DR) dataset.

Images 421-429 comprise images of retinas labeled as "diseased." As alluded to above, examples of the disclosed technology can compare images 421-429 (examples of production images in this case) to the "healthy" reference images 401-404 to detect/determine anomalies among images 421-429. Here, an anomaly may be indicative of disease.

For instance, examples can compute a Gramian matrix for "healthy" reference images 401-404 and images 421-429, and then apply a nearest neighbor algorithm to compute a distance for each image. Larger distances from the reference images may indicate an anomaly/disease. In FIG. 4, the computed distance for each image is displayed above the respective image.

As depicted, examples of the present technology have determined that image 421 (i.e., an image labeled as a "diseased" retina) is in fact similar to the "healthy" reference images based on the computed distance values. Accordingly, a clinician may consider reexamining image 421 to determine whether the illustrated retina is in fact "diseased" as originally labeled.

By contrast, examples of the present technology have determined that images 422-429 are relative anomalies compared to the "healthy" reference images based on the computed distance values.

Figure 5:
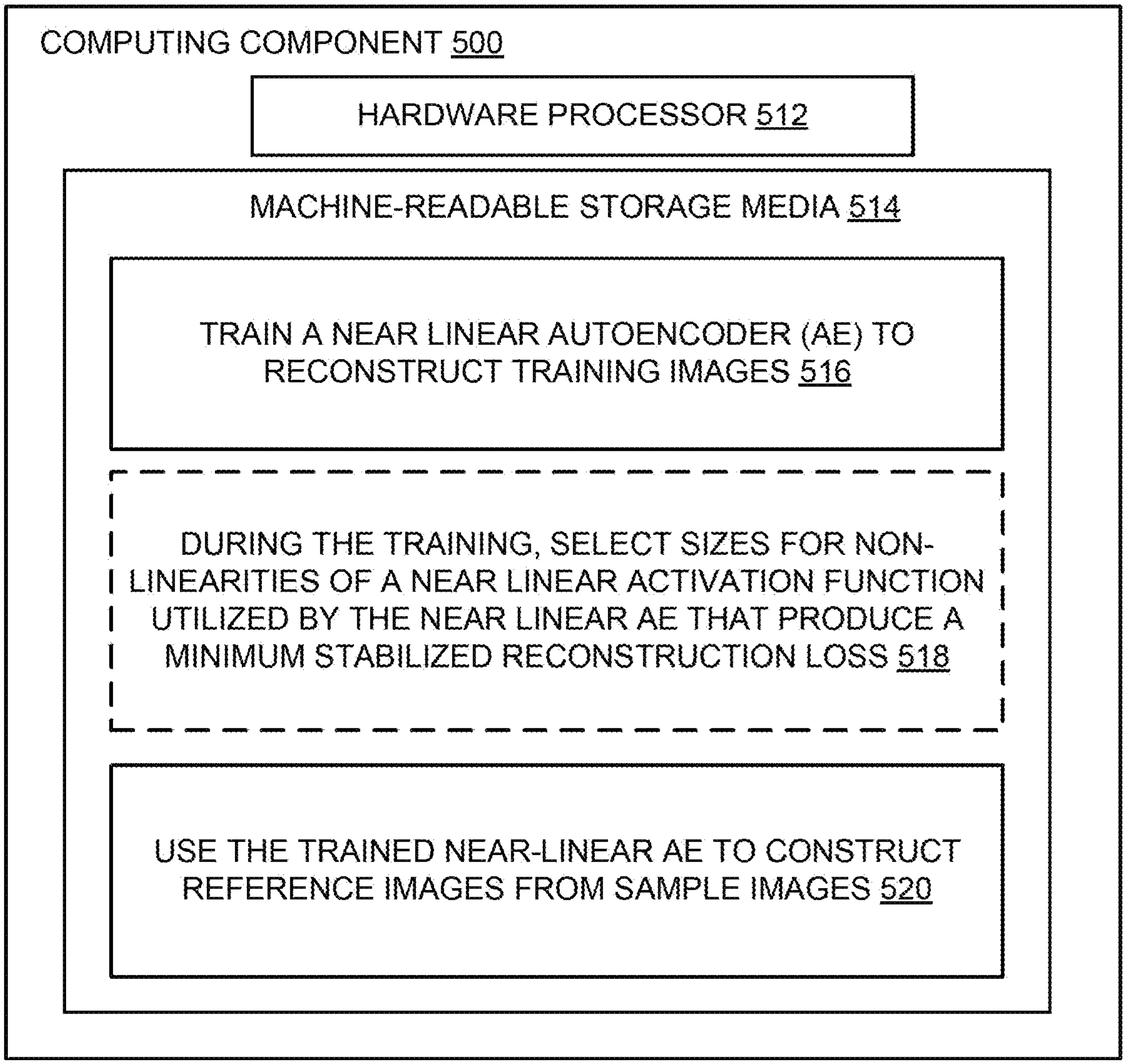
FIG. 5 depicts an example computing component that can be used to train near linear AEs to construct reference images, in accordance with various examples of the presently disclosed technology.

FIG. 5 depicts an example computing component 500 that can be used to train near linear AEs to construct reference images, in accordance with various examples of the presently disclosed technology.

Computing component 500 may be, for example, a server computer, a controller, or any other similar computing component capable of processing data. In the example implementation of FIG. 5, the computing component 510 includes a hardware processor 512, and machine-readable storage medium for 514.

Hardware processor 512 may be one or more central processing units (CPUs), semiconductor-based microprocessors, and/or other hardware devices suitable for retrieval and execution of instructions stored in machine-readable storage medium 514. Hardware processor 512 may fetch, decode, and execute instructions, such as instructions 516-520, to control processes or operations for burst preloading for available bandwidth estimation. As an alternative or in addition to retrieving and executing instructions, hardware processor 512 may include one or more electronic circuits that include electronic components for performing the functionality of one or more instructions, such as a field programmable gate array (FPGA), application specific integrated circuit (ASIC), or other electronic circuits.

A machine-readable storage medium, such as machine-readable storage medium 514, may be any electronic, magnetic, optical, or other physical storage device that contains or stores executable instructions. Thus, machine-readable storage medium 514 may be, for example, Random Access Memory (RAM), non-volatile RAM (NVRAM), an Electrically Erasable Programmable Read-Only Memory (EEPROM), a storage device, an optical disc, and the like. In some examples, machine-readable storage medium 514 may be a non-transitory storage medium, where the term "non-transitory" does not encompass transitory propagating indicators. As described in detail below, machine-readable storage medium 514 may be encoded with executable instructions, for example, instructions 516-520. Further, although the instructions shown in FIG. 5 are in an order, the shown order is not the only order in which the instructions may be executed. Any instruction may be performed in any order, at any time, may be performed repeatedly, and/or may be performed by any suitable device or devices.

As depicted, hardware processor 512 executes instruction 516 to cause computing component 500 to train an autoencoder (AE) to reconstruct training images. As alluded to above, the AE may utilize a piece-wise near linear activation function comprising: (a) a linearly-sloped middle segment spanning a majority of a domain of the piece-wise near linear activation function; (b) a first end segment with a different slope than the linearly-sloped middle segment, wherein the first end segment commences at a lower boundary of the domain of the piece-wise near linear activation function and terminates at a first end of the linearly-sloped middle segment; and (c) a second end segment with a different slope than the linearly-sloped middle segment, wherein the second end segment commences at a second end of the linearly-sloped middle segment and terminates at an upper boundary of the domain of the piece-wise near linear activation function. Because the AE utilizes the piece-wise near linear activation function, the AE is sometimes referred to herein as a "near linear" AE.

In certain implementations, the first end segment and the second end segment may each span an end segment-domain length comprising ten percent (10%) or less of the domain of the piece-wise near linear activation function. Accordingly, the linearly-sloped middle segment may span 80% or more of the domain of the piece-wise near linear activation function.

In some implementations, one or both of the first end segment and the second end segment may comprise non-linear function segments. However in other implementations, one or both of the first end segment and the second end segment may comprise linear function segments with different slopes than the linearly-sloped middle segment.

In some implementations, hardware processor 512 can execute instruction 518 to cause computing component 500 to determine a value for the end segment-domain length that produces a minimum stabilized reconstruction loss when the AE reconstructs training images. In various implementations, determining the value for the end segment-domain length that produces a minimum stabilized reconstruction loss may comprise utilizing a successive halving algorithm to evaluate multiple values for the end segment-domain length.

As depicted, hardware processor 512 executes instruction 520 to cause computing component 500 use the trained AE to construct reference images from sample images. As alluded to above, the reference images may be used as a "gold standard" against which production images can be compared in order to detect/determine anomalies within the production images.

Figure 6:
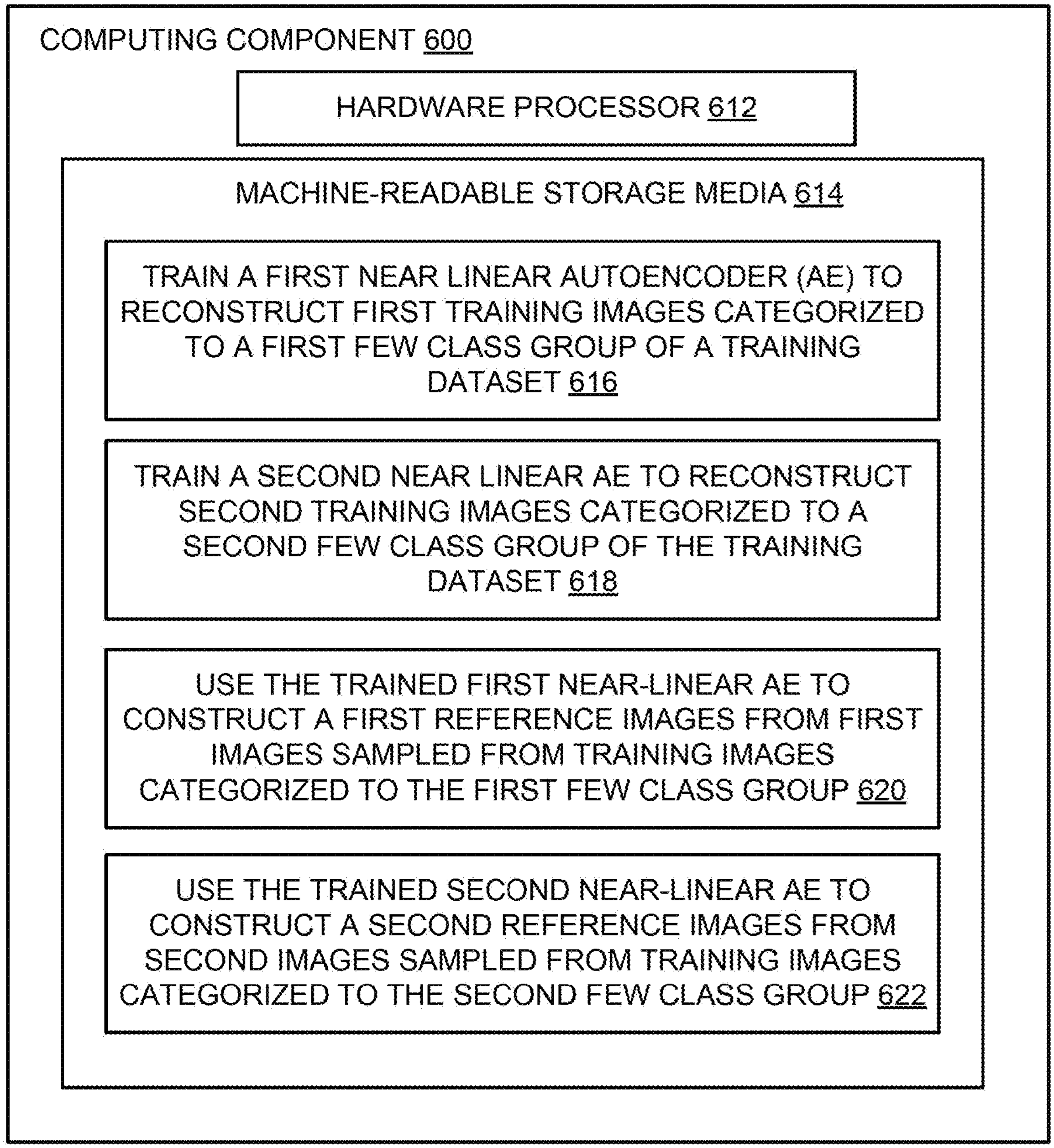
FIG. 6 depicts another example computing component that can be used to train near linear AEs to construct reference images, in accordance with various examples of the presently disclosed technology.

FIG. 6 depicts example computing component 600 that can be used to train near linear AEs to construct reference images, in accordance with various examples of the presently disclosed technology.

Computing component 600 comprises an analogous hardware processor (i.e., hardware processor 612), machine-readable storage media (i.e., machine-readable storage media 614), and instructions to computing component 500. Accordingly, such elements will not be described again for brevity.

As depicted, hardware processor 612 executes instruction 616 to cause computing component 600 to train a first autoencoder (AE) to reconstruct images categorized to a first few class group of a training dataset. Relatedly, hardware processor 612 executes instruction 618 to train a second AE to reconstruct images categorized to a second few class group of the training dataset.

As alluded to above, both the first and second AEs may utilize a piece-wise near linear activation function comprising: (a) a linearly-sloped middle segment spanning a majority of a domain of the piece-wise near linear activation function; (b) a first end segment with a different slope than the linearly-sloped middle segment, wherein the first end segment commences at a lower boundary of the domain of the piece-wise near linear activation function and terminates at a first end of the linearly-sloped middle segment; and (c) a second end segment with a different slope than the linearly-sloped middle segment, wherein the second end segment commences at a second end of the linearly-sloped middle segment and terminates at an upper boundary of the domain of the piece-wise near linear activation function. Because the first and second AEs utilize the piece-wise near linear activation function, the first and second AEs are sometimes referred to herein as "near linear" AEs.

In certain implementations, the first end segment and the second end segment may each span an end segment-domain length comprising ten percent (10%) or less of the domain of the piece-wise near linear activation function. Accordingly, the linearly-sloped middle segment may span 80% or more of the domain of the piece-wise near linear activation function.

In some implementations, one or both of the first end segment and the second end segment may comprise non-linear function segments. However in other implementations, one or both of the first end segment and the second end segment may comprise linear function segments with different slopes than the linearly-sloped middle segment.

In some implementations, hardware processor 612 can execute instructions to cause computing component 600 to determine a value for the end segment-domain length that produces a minimum stabilized reconstruction loss when the first and second AEs reconstruct training images. In various implementations, determining the value for the end segment-domain length that produces a minimum stabilized reconstruction loss may comprise utilizing a successive halving algorithm to evaluate multiple values for the end segment-domain length.

As alluded to above, the training dataset may comprise images labeled according to a plurality of classes. The first few class group may comprise images labeled (or otherwise categorized) according to a first subset of the plurality of classes. The second few class group may comprise images labeled (or otherwise categorized) according to a second subset of the plurality of classes. In certain implementations, hardware processor 612 executes instructions that cause computing component 600 to categorize images of the training dataset to the first and second few class group respectively.

As depicted, hardware processor 612 can execute instruction 620 to use the trained first AE to construct first reference images from first images sampled from the first few class group. Relatedly, hardware processor 612 can execute instruction 622 to use the trained second AE to construct second reference images from second images sampled from the second few class group. As alluded to above, the first reference images and the second reference images can be used as "gold standards" against which production images are compared in order to detect/determine anomalies within the production images.

Figure 7:
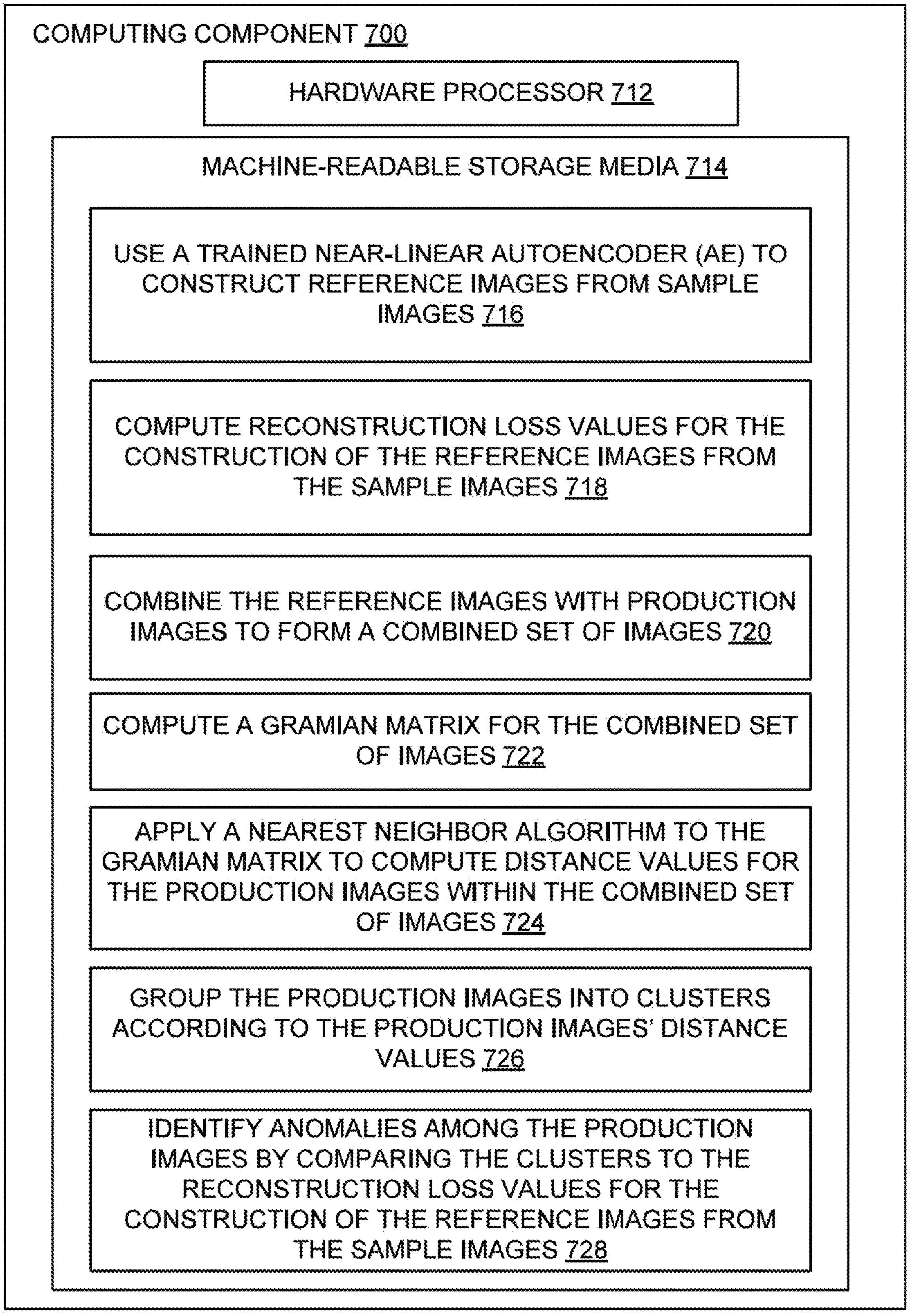
FIG. 7 depicts an example computing component that can be used to identify anomalous images, in accordance with various examples of the presently disclosed technology.

FIG. 7 depicts an example computing component that can be used to identify anomalous images, in accordance with various examples of the presently disclosed technology.

Computing component 700 comprises an analogous hardware processor (i.e., hardware processor 712), machine-readable storage media (i.e., machine-readable storage media 714), and instructions to computing component 700. Accordingly, such elements will not be described again for brevity.

As depicted, hardware processor 712 executes instruction 716 to use a trained autoencoder (AE) to construct reference images from sample images.

As alluded to above, the trained AE may utilize a piece-wise near linear activation function comprising: (a) a linearly-sloped middle segment spanning a majority of a domain of the piece-wise near linear activation function; (b) a first end segment with a different slope than the linearly-sloped middle segment, wherein the first end segment commences at a lower boundary of the domain of the piece-wise near linear activation function and terminates at a first end of the linearly-sloped middle segment; and (c) a second end segment with a different slope than the linearly-sloped middle segment, wherein the second end segment commences at a second end of the linearly-sloped middle segment and terminates at an upper boundary of the domain of the piece-wise near linear activation function. Because the trained AE utilizes the piece-wise near linear activation function, the trained AE is sometimes referred to herein as a "near linear" AE.

In certain implementations, the first end segment and the second end segment may each span an end segment-domain length comprising ten percent (10%) or less of the domain of the piece-wise near linear activation function. Accordingly, the linearly-sloped middle segment may span 80% or more of the domain of the piece-wise near linear activation function.

In some implementations, one or both of the first end segment and the second end segment may comprise non-linear function segments. However in other implementations, one or both of the first end segment and the second end segment may comprise linear function segments with different slopes than the linearly-sloped middle segment.

As depicted, hardware processor 712 can execute further instructions (i.e., instructions 718-728) that cause computing component 700 to identify anomalies among production images by comparing the production images to the reference images.

For example, hardware processor 712 can execute instruction 718 to cause computing component 700 to compute reconstruction loss values for the construction of the reference images from the sample images.

Hardware processor 712 can then execute instruction 720 to cause computing component 700 to combine the reference images with production images to form a combined set of images.

Hardware processor 712 can then execute instruction 722 to cause computing component 700 to compute a Gramian matrix for the combined set of images.

Hardware processor 712 can then execute instruction 724 to cause computing component 700 to apply a nearest neighbor algorithm to the Gramian matrix to compute distance values for the production images within the combined set of images.

Hardware processor 712 can then execute instruction 726 to cause computing component 700 to group the production images into clusters according to the production images' distance values.

Hardware processor 712 can then execute instruction 728 to cause computing component 700 to identify anomalies among the production images by comparing the clusters to the computed reconstruction loss values.

Figure 8:
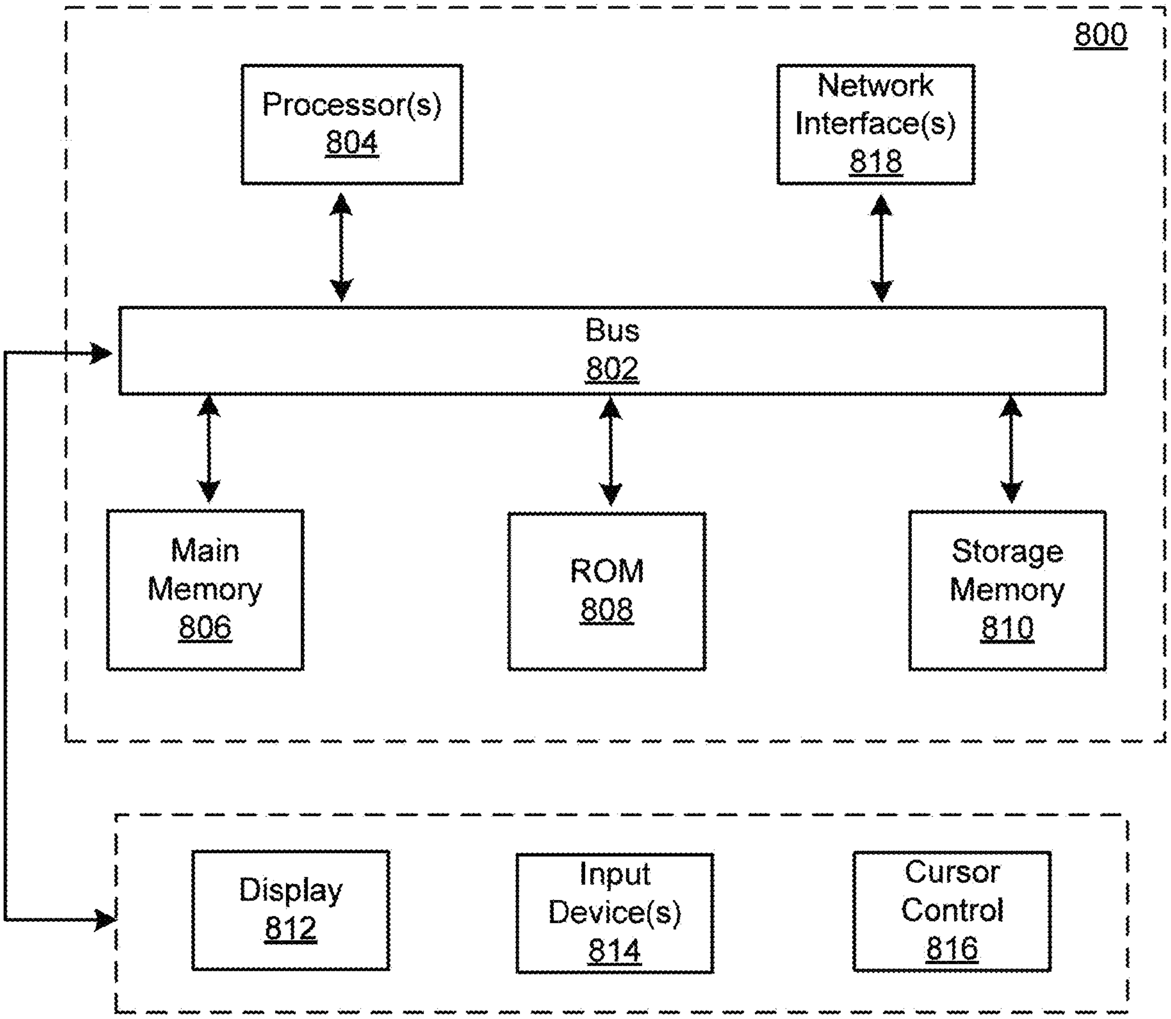
FIG. 8 depicts a block diagram of an example computer system in which various of the examples described herein may be implemented.

FIG. 8 depicts a block diagram of an example computer system 800 in which various of the examples described herein may be implemented. For example, computing system 800 may be used to implement any one of computing component 200 of FIGS. 2-3, computing component 500 of FIG. 5, computing component 600 of FIG. 6, and computing component 700 of FIG. 7. The computer system 800 includes a bus 802 or other communication mechanism for communicating information, one or more hardware processors 804 coupled with bus 802 for processing information. Hardware processor(s) 804 may be, for example, one or more general purpose microprocessors.

The computer system 800 also includes a main memory 806, such as a random access memory (RAM), cache and/or other dynamic storage devices, coupled to bus 802 for storing information and instructions to be executed by processor 804. Main memory 806 also may be used for storing temporary variables or other intermediate information during execution of instructions to be executed by processor 804. Such instructions, when stored in storage media accessible to processor 804, render computer system 800 into a special-purpose machine that is customized to perform the operations specified in the instructions.

The computer system 800 further includes a read only memory (ROM) 808 or other static storage device coupled to bus 802 for storing static information and instructions for processor 804. A storage device 810, such as a magnetic disk, optical disk, or USB thumb drive (Flash drive), etc., is provided and coupled to bus 802 for storing information and instructions.

The computer system 800 may be coupled via bus 802 to a display 812, such as a liquid crystal display (LCD) (or touch screen), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. In some examples, the same direction information and command selections as cursor control may be implemented via receiving touches on a touch screen without a cursor.

The computing system 800 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "engine," "system," "database," data store," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 800 may implement the techniques described herein using customized hard-wired logic, one or more ASICs or FPGAS, firmware and/or program logic which in combination with the computer system causes or programs computer system 800 to be a special-purpose machine. According to one example, the techniques herein are performed by computer system 800 in response to processor(s) 804 executing one or more sequences of one or more instructions contained in main memory 806. Such instructions may be read into main memory 806 from another storage medium, such as storage device 810. Execution of the sequences of instructions contained in main memory 806 causes processor(s) 804 to perform the process steps described herein. In alternative examples, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 810. Volatile media includes dynamic memory, such as main memory 806. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 802. Transmission media can also take the form of acoustic or light waves, such as those generated during radio-wave and infra-red data communications.

The computer system 800 also includes a communication interface 818 coupled to bus 802. Network interface 818 provides a two-way data communication coupling to one or more network links that are connected to one or more local networks. For example, communication interface 818 may be an integrated services digital network (ISDN) card, cable modem, satellite modem, or a modem to provide a data communication connection to a corresponding type of telephone line. As another example, network interface 818 may be a local area network (LAN) card to provide a data communication connection to a compatible LAN (or WAN component to communicated with a WAN). Wireless links may also be implemented. In any such implementation, network interface 818 sends and receives electrical, electromagnetic or optical indicators that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet." Local network and Internet both use electrical, electromagnetic or optical indicators that carry digital data streams. The indicators through the various networks and the indicators on network link and through communication interface 818, which carry the digital data to and from computer system 800, are example forms of transmission media.

The computer system 800 can send messages and receive data, including program code, through the network(s), network link and communication interface 818. In the Internet example, a server might transmit a requested code for an application program through the Internet, the ISP, the local network and the communication interface 818.

The received code may be executed by processor 804 as it is received, and/or stored in storage device 810, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example examples. The performance of certain of the operations or processes may be distributed among computer systems or computers processors, not only residing within a single machine, but deployed across a number of machines.

As used herein, a circuit might be implemented utilizing any form of hardware, software, or a combination thereof. For example, one or more processors, controllers, ASICs, PLAS, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computer system 800.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain examples include, while other examples do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A method comprising:

training an autoencoder (AE) to reconstruct training images, wherein the AE utilizes a piece-wise near linear activation function comprising:

a linearly-sloped middle segment spanning more than 50% of a domain of the piece-wise near linear activation function;

a first end segment with a different slope than the linearly-sloped middle segment, wherein the first end segment commences at a lower boundary of the domain of the piece-wise near linear activation function and terminates at a first end of the linearly-sloped middle segment, and a second end segment with a different slope than the linearly-sloped middle segment, wherein the second end segment commences at a second end of the linearly-sloped middle segment and terminates at an upper boundary of the domain of the piece-wise near linear activation function; and using the trained AE to construct reference images from sample images.

2. The method of claim 1, wherein:

the first end segment and the second end segment each span an end segment-domain length comprising ten percent (10%) or less of the domain of the piece-wise near linear activation function; and the method further comprises determining a value for the end segment-domain length that produces a minimum stabilized reconstruction loss when the AE reconstructs the training images.

3. The method of claim 2, wherein determining the value for the end segment-domain length comprises utilizing a successive halving algorithm to evaluate multiple values for the end segment-domain length.

4. The method of claim 1, wherein the first end segment comprises a non-linear function segment.

5. The method of claim 1, wherein the first end segment comprises a linear function segment with the different slope than the linearly-sloped middle segment.

6. The method of claim 1, wherein:

the training images comprise images categorized to a first few class group of a training dataset;

the sample images comprise images categorized to the first few class group of the training dataset;

the training dataset comprises images labeled according to a plurality of classes;

the first few class group comprises images labeled according to a first subset of the plurality of classes;

a second few class group of the training dataset comprises images labeled according to a second subset of the plurality of classes; and the method further comprises:

training a second AE to reconstruct second training images categorized to the second few class group, wherein the second AE utilizes the piece-wise near linear activation function, and using the second trained AE to construct a second set of reference images from a second set of sample images categorized to the second few class group.

7. A system comprising:

one or more processors operative to execute machine-readable instructions that cause the system to:

train a first autoencoder (AE) to reconstruct images categorized to a first few class group of a training dataset, wherein the first AE utilizes a piece-wise near linear activation function comprising:

a linearly-sloped middle segment spanning more than 50% of a domain of the piece-wise near linear activation function, a first end segment with a different slope than the linearly-sloped middle segment, wherein the first end segment commences at a lower boundary of the domain of the piece-wise near linear activation function and terminates at a first end of the linearly-sloped middle segment, a second end segment with a different slope than the linearly-sloped middle segment, wherein the second end segment commences at a second end of the linearly-sloped middle segment and terminates at an upper boundary of the domain of the piece-wise near linear activation function; and train a second AE to reconstruct images categorized to a second few class group of the training dataset, wherein the second AE utilizes the piece-wise near linear activation function.

8. The system of claim 7, further comprising:

categorizing images from the training dataset into the first few class group and the second few class group according to a heuristic.

9. The system of claim 8, wherein:

the training dataset comprises images labeled according to a plurality of classes;

the first few class group comprises images labeled according to a first subset of the plurality of classes; and the second few class group comprises images labeled according to a second subset of the plurality of classes.

10. The system of claim 7, wherein the one or more processors are further operative to execute machine-readable instructions that cause the system to:

use the trained first AE to construct first reference images from first images sampled from the first few class group; and use the trained second AE to construct second reference images from second images sampled from the second few class group.

11. The system of claim 7, wherein:

the first end segment and the second end segment each span an end segment-domain length comprising ten percent (10%) or less of the domain of the piece-wise near linear activation function.

12. The system of claim 11, wherein the one or more processors are further operative to execute machine-readable instructions that cause the system to:

determine a value for the end segment-domain length that produces a minimum stabilized reconstruction loss when the first and second AEs reconstruct images categorized to the first few class group of the training dataset and the second few class group of the training dataset respectively, during training.

13. The system of claim 12, wherein determining the value for the end segment-domain length comprises utilizing a successive halving algorithm to evaluate multiple values for the end segment-domain length.

14. The system of claim 7, wherein the first end segment comprises a non-linear function segment.

15. The system of claim 7, wherein the first end segment comprises a linear function segment with the different slope than the linearly-sloped middle segment.

16. A non-transitory computer-readable medium storing instructions, which when executed by one or more processors, cause the one or more processors to:

use a trained autoencoder (AE) to construct reference images from sample images, wherein the AE utilizes a piece-wise near linear activation function comprising:

a linearly-sloped middle segment spanning at least eighty percent (80%) of a domain of the piece-wise near linear activation function, a first end segment with a different slope than the linearly-sloped middle segment, wherein the first end segment commences at a lower boundary of the domain of the piece-wise near linear activation function and terminates at a first end of the linearly-sloped middle segment, and a second end segment with a different slope than the linearly-sloped middle segment, wherein the second end segment commences at a second end of the linearly-sloped middle segment and terminates at an upper boundary of the domain of the piece-wise near linear activation function.

17. The non-transitory computer-readable medium of claim 16, further storing instructions, which when executed by the one or more processors, cause the one or more processors to:

identify anomalies among production images by comparing the production images to the reference images.

18. The non-transitory computer-readable medium of claim 17, wherein identifying the anomalies among the production images by comparing the production images to the reference images comprises:

computing reconstruction loss values for the construction of the reference images from the sample images;

combining the reference images with the production images to form a combined set of images;

computing a Gramian matrix for the combined set of images;

applying a nearest neighbor algorithm to the Gramian matrix to compute distance values for the production images within the combined set of images;

grouping the production images into clusters according to the production images' distance values; and identifying the anomalies among the production images by comparing the clusters to the computed reconstruction loss values.

19. The non-transitory computer-readable medium of claim 16, wherein the first end segment and the second end segment each span an end segment-domain length comprising ten percent (10%) or less of the domain of the piece-wise near linear activation function.

20. The non-transitory computer-readable medium of claim 16, wherein the first end segment comprises at least one of:

a non-linear function segment; and a linear function segment with the different slope than the linearly-sloped middle segment.

* * * * *